United States Patent
Miller et al.

(10) Patent No.: US 10,677,158 B2
(45) Date of Patent: Jun. 9, 2020

(54) METHOD AND SYSTEM FOR IN-LINE DISTRIBUTED PROPULSION

(71) Applicant: General Electric Company, Schenectady, NY (US)

(72) Inventors: Brandon Wayne Miller, Middletown, OH (US); Narendra Digamber Joshi, Guilderland, NY (US); Ian Francis Prentice, Cincinnati, OH (US); Kurt David Murrow, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/982,793

(22) Filed: Dec. 29, 2015

(65) Prior Publication Data

US 2017/0184020 A1    Jun. 29, 2017

(51) Int. Cl.
*F02C 3/107*      (2006.01)
*F02K 3/065*      (2006.01)
(Continued)

(52) U.S. Cl.
CPC ............... *F02C 3/107* (2013.01); *F01D 5/02* (2013.01); *F01D 25/30* (2013.01); *F02C 7/04* (2013.01);
(Continued)

(58) Field of Classification Search
CPC ... F02K 3/077; F02K 3/04; F02K 3/06; F02K 3/062; F02K 3/065; F02K 3/072;
(Continued)

(56) References Cited

U.S. PATENT DOCUMENTS 1,966,382 A    7/1934  Donohue, Jr.
2,154,532 A    4/1939  Ryder
(Continued)

FOREIGN PATENT DOCUMENTS

EP    0426500 A1 *  5/1991  ............. F02K 3/075
FR    1239218 A  *  8/1960  ............. F02K 3/062
(Continued)

OTHER PUBLICATIONS

A European Search Report and Opinion issued in connection with corresponding EP Application No. 16203694.1 dated May 15, 2017.
(Continued)

*Primary Examiner* — Alain Chau
(74) *Attorney, Agent, or Firm* — Dority & Manning, P.A.

(57) ABSTRACT

A gas turbine engine system and method of operating gas turbine engines are provided. The gas turbine engine assembly includes a gas turbine engine includes a power shaft configured to rotate about an axis of rotation. The gas turbine engine assembly also includes a first fan and a second fan coupled to the power shaft coaxially with the gas turbine engine. The gas turbine engine assembly also includes a first fan duct configured to direct a first stream of air to the first fan. The gas turbine engine assembly also includes a second fan duct configured to direct a second stream of air to the second fan. The gas turbine engine assembly also includes an exhaust duct configured to direct a stream of exhaust gases of the gas turbine engine in a direction of the axis of rotation.

18 Claims, 9 Drawing Sheets

(51) Int. Cl.

| | | |
|---|---|---|
| *F02K 3/077* | (2006.01) | |
| *F01D 5/02* | (2006.01) | |
| *F01D 25/30* | (2006.01) | |
| *F02C 7/04* | (2006.01) | |
| *F02C 7/36* | (2006.01) | |
| *F04D 29/32* | (2006.01) | |
| *F02K 3/062* | (2006.01) | |
| *F02K 3/06* | (2006.01) | |

(52) U.S. Cl.
CPC .................. *F02C 7/36* (2013.01); *F02K 3/06* (2013.01); *F02K 3/062* (2013.01); *F02K 3/065* (2013.01); *F02K 3/077* (2013.01); *F04D 29/325* (2013.01); *F05D 2220/36* (2013.01); *F05D 2230/60* (2013.01); *F05D 2240/35* (2013.01); *F05D 2250/311* (2013.01); *F05D 2250/50* (2013.01); *Y02T 50/671* (2013.01)

(58) Field of Classification Search
CPC ...... F02K 3/02; F02C 7/04; F02C 7/36; F02C 3/107; F01D 5/02; F01D 25/30; F05D 2250/50; F05D 2250/51; F05D 2250/52; F05D 2220/36
USPC .......................................................... 60/226.1
See application file for complete search history.

(56) References Cited

U.S. PATENT DOCUMENTS

| | | | | |
|---|---|---|---|---|
| 3,394,548 A | * | 7/1968 | Grieb | F02K 3/06 60/226.1 |
| 3,779,282 A | * | 12/1973 | Klees | F02K 3/04 137/625.46 |
| 3,792,584 A | * | 2/1974 | Klees | F02K 3/025 415/79 |
| 3,854,286 A | * | 12/1974 | Klees | F02K 3/025 239/265.11 |
| 3,938,328 A | * | 2/1976 | Klees | F02K 3/04 60/224 |
| 4,052,845 A | * | 10/1977 | Tumavicus | F02K 3/075 60/226.3 |
| 4,054,030 A | * | 10/1977 | Pedersen | F02K 3/075 415/145 |
| 4,222,234 A | * | 9/1980 | Adamson | B64C 29/0066 244/23 D |
| 4,474,345 A | | 10/1984 | Musgrove | |
| 4,569,199 A | * | 2/1986 | Klees | F02C 6/206 60/226.1 |
| 5,058,379 A | * | 10/1991 | Lardellier | F02K 3/065 60/226.1 |
| 5,996,935 A | | 12/1999 | Snell | |
| 6,209,311 B1 | | 4/2001 | Itoh et al. | |
| 6,260,800 B1 | | 7/2001 | Snell | |
| 6,351,940 B1 | * | 3/2002 | Guinan | F02C 7/04 60/226.1 |
| 6,792,745 B2 | | 9/2004 | Wojciechowski | |
| 7,216,475 B2 | * | 5/2007 | Johnson | F02K 3/065 60/226.1 |
| 7,770,377 B2 | | 8/2010 | Rolt | |
| 7,887,287 B2 | * | 2/2011 | Yanagi | B64D 27/18 415/145 |
| 7,921,637 B2 | * | 4/2011 | Yanagi | B64C 7/02 60/226.1 |
| 8,402,740 B2 | | 3/2013 | Guemmer | |
| 9,039,567 B2 | | 5/2015 | Fabre | |
| 2004/0179941 A1 | | 9/2004 | Negulescu | |
| 2006/0093467 A1 | | 5/2006 | Orlando et al. | |
| 2008/0075580 A1 | * | 3/2008 | Yanagi | B64D 27/18 415/119 |
| 2008/0098719 A1 | | 5/2008 | Addis | |
| 2009/0211222 A1 | * | 8/2009 | Roberge | F02C 3/13 60/226.1 |
| 2012/0131902 A1 | | 5/2012 | Baughman et al. | |
| 2013/0081375 A1 | * | 4/2013 | Powell | F02C 7/04 60/226.1 |

FOREIGN PATENT DOCUMENTS

| | | | | | |
|---|---|---|---|---|---|
| FR | 1325278 A | * | 4/1963 | ............. | F02K 3/062 |
| FR | 2972769 A1 | * | 9/2012 | ............. | F02K 1/386 |
| GB | 2155110 A | | 9/1985 | | |
| JP | S54-39718 A | | 3/1979 | | |
| JP | 60256521 A | | 12/1985 | | |
| JP | S60-256521 A | | 12/1985 | | |
| JP | 2009-215895 A | | 9/2009 | | |

OTHER PUBLICATIONS

Unofficial English Translation of Chinese Office Action issued in connection with corresponding CN Application No. 201611243692.8 dated Jan. 2, 2018.

Machine translation and a Office Action issued in connection with Corresponding JP Application No. 2016242827 dated Jan. 9, 2018.

Machine Translation and Notification of Reasons for Refusal issued in connection with corresponding JP Application No. 2016-242827 dated Sep. 4, 2018.

\* cited by examiner

METHOD AND SYSTEM FOR IN-LINE DISTRIBUTED PROPULSION

BACKGROUND

This description relates to gas turbine engines, and, more particularly, to a method and system for configuring gas turbine engines having multiple fans to reduce a fan pressure ratio.

At least some known high bypass turbofans have very large fans. The low pressure turbine (LPT) is typically coupled to the fan in a direct drive configuration. Accordingly, for a very large fan, the LPT spins relatively slowly, which leads to high loading and reduced efficiency. One known method of attempting to address this problem is to use distributed engines, for example, multiple smaller fans. However, such a solution requires additional equipment such as, but not limited to bevel gears, or lateral power transmission equipment both of which add weight and complexity to the aircraft.

BRIEF DESCRIPTION

In one embodiment, a gas turbine engine assembly includes a gas turbine engine including a rotor assembly having an axis of rotation and a power shaft configured to rotate about the axis of rotation. The gas turbine engine assembly also includes a first fan coupled to the power shaft and a second fan coupled to the power shaft coaxially with the first fan and the gas turbine engine. The second fan is axially displaced forward of the first fan. The gas turbine engine assembly also includes a first fan duct configured to direct a first stream of air to the first fan. The gas turbine engine assembly also includes a second fan duct configured to direct a second stream of air to the second fan. The outlet openings of the first and second fan ducts are configured to direct the streams of fan air in a direction of the axis of rotation.

In another embodiment, a method of operating a gas turbine engine includes providing a gas turbine engine including a rotor assembly having an axis of rotation wherein the gas turbine engine includes a power shaft configured to rotate about the axis of rotation. The method also includes coupling a first fan to the power shaft and coupling a second fan to the power shaft coaxially with the first fan and the gas turbine engine, the second fan axially displaced forward of the first fan. The method further includes positioning a first fan duct to direct a first stream of air to the first fan and positioning a second fan duct to direct a second stream of air to the second fan wherein the second stream of air is different than the first stream of air. The method further includes positioning a first and second outlet opening to direct a stream of exhaust gases of the gas turbine engine in a direction of the axis of rotation.

In yet another embodiment, an aircraft powered by one or more high-bypass turbofan engines includes a core engine configured to generate a stream of high pressure and high temperature exhaust gases and a turbine configured to drive a plurality of fans using the core engine stream of exhaust gases wherein the plurality of fans are coaxial with respect to each other and each fan compresses a separate stream of air.

BRIEF DESCRIPTION OF THE DRAWINGS

FIGS. 1-10 show example embodiments of the method and system described herein.

FIG. 1 is a schematic illustration of an exemplary gas turbine engine.

FIG. 2 is a perspective view looking aft of a gas turbine engine assembly in accordance with an exemplary embodiment of the present disclosure.

FIG. 3 is a perspective view looking forward of gas turbine engine assembly shown in FIG. 2.

FIG. 4 is a side elevation view of gas turbine engine assembly in an embodiment of the present disclosure.

FIG. 5 is a side elevation view of a gas turbine engine assembly in accordance with another embodiment of the present disclosure.

FIG. 6 is a side elevation view of a gas turbine engine assembly in accordance with another embodiment of the present disclosure.

FIG. 7 is a side elevation view of a gas turbine engine assembly in accordance with another embodiment of the present disclosure.

FIG. 9 is a plan view of a gas turbine engine assembly 900 in accordance with another example embodiment of the present disclosure.

FIG. 10 is a perspective view of an aircraft that may be used with the various gas turbine engine assemblies described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to rotating machinery in industrial, commercial, and residential applications.

Embodiments of a high bypass gas turbine engine that includes a plurality of coaxial fans are described herein. Providing two or more fans that compress different streams of air facilitates improving a propulsive efficiency that is commonly associated with distributed propulsion. However, this benefit is accomplished without the complication of bevel gears, or lateral power transmission equipment. In these embodiments, the fan inlets, exhausts, and interconnecting ducts are integrated with a wing and/or fuselage structure for boundary layer ingestion (BLI) and/or lift benefits.

High bypass turbofan gas turbine engines may have very large fans. The low pressure turbine (LPT) is typically coupled to the fan in a direct drive configuration. Accordingly, for a very large fan, the LPT spins relatively slowly, which leads to high loading and reduced efficiency. In one embodiment, the fan is divided into multiple coaxial fans that compress separate streams of air to generate thrust, the overall fan size is reduced, and the high bypass turbofan can be integrated under the wing while respecting the ground plane/rotation installation requirements and permitting use of one or more LPTs that can operate at higher speeds than a single LPT driving a single large diameter fan.

The following description refers to the accompanying drawings, in which, in the absence of a contrary representation, the same numbers in different drawings represent similar elements.

Figure 1:
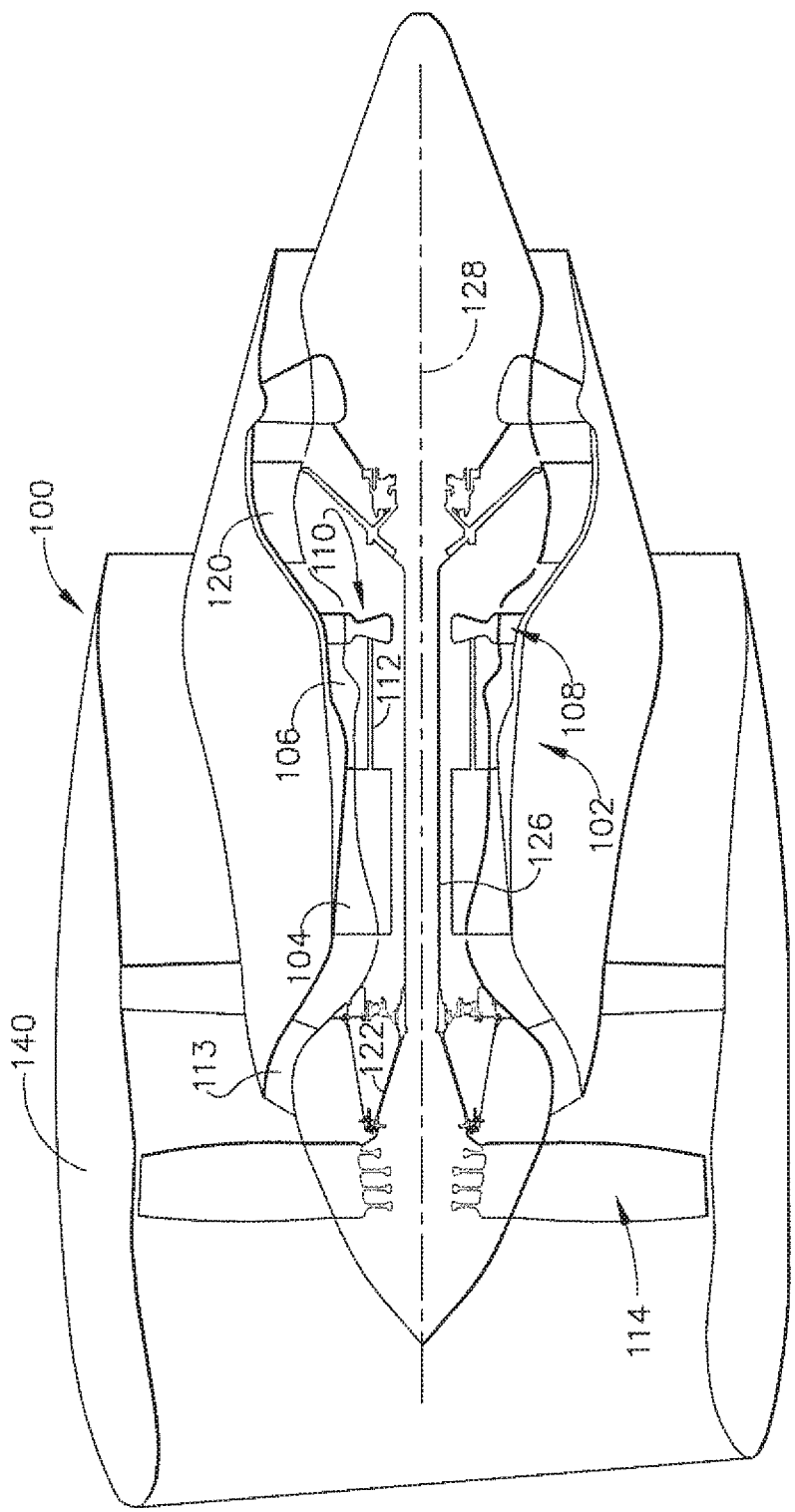

FIG. 1 is a side elevation view of a gas turbine engine 100. Gas turbine engine 100 includes a gas generator or core engine 102 that includes a high pressure compressor (HPC) 104, a combustor assembly 106, and a high pressure turbine (HPT) 108 in an axial serial flow relationship on a core engine rotor 110 rotating about a core engine shaft 112. Gas turbine engine 100 also includes a low pressure or booster compressor 113, a fan 114, and a low pressure turbine 120 arranged in an axial flow relationship on a power engine rotor 122 rotatable about a power engine shaft 126.

During operation, air flows along a central axis 128, and compressed air is supplied to high pressure compressor 104. The highly compressed air is delivered to combustor assembly 106. Exhaust gas flow (not shown in FIG. 1) from combustor assembly 106 drives turbines 108 and 120, and turbine 120 drives booster compressor 113, if present, and fan 114 by way of shaft 126. Gas turbine engine 100 also includes a fan containment case 140.

Figure 3:
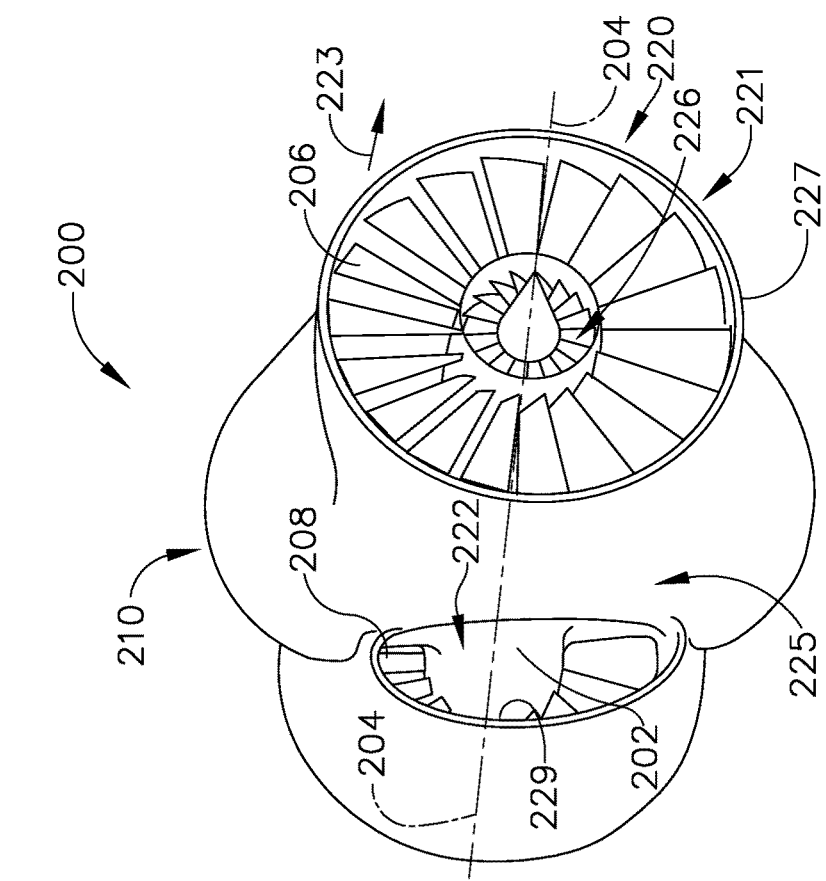
Figure 2:
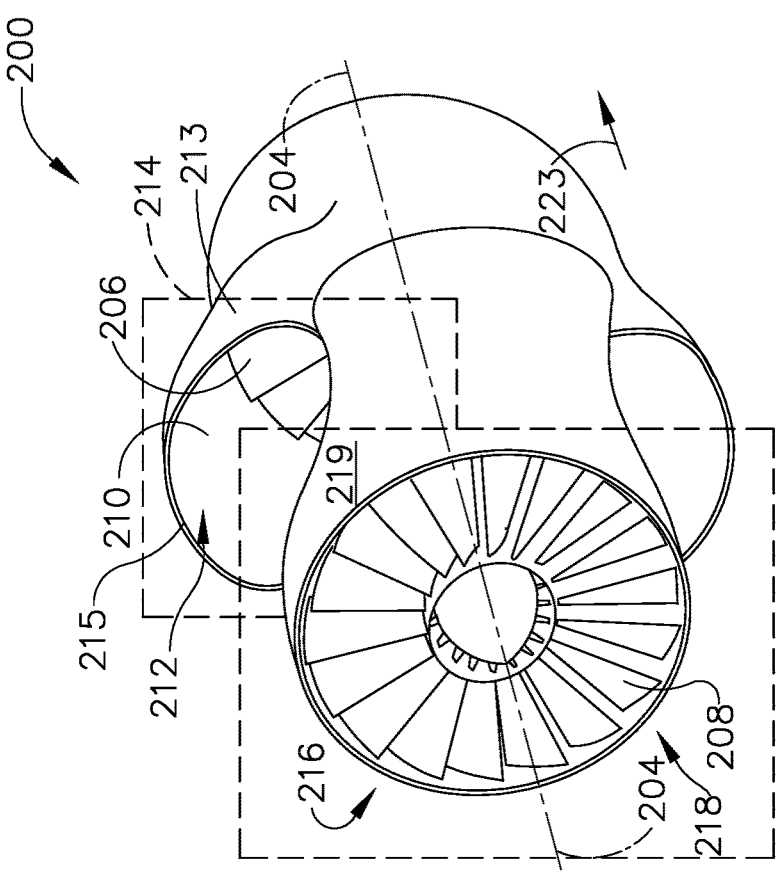

FIG. 2 is a perspective view looking aft of a gas turbine engine assembly 200 in accordance with an exemplary embodiment of the present invention. FIG. 3 is a perspective view looking forward of gas turbine engine assembly 200. In the exemplary embodiment, a gas turbine engine 202 includes one or more rotor assemblies (not shown in FIG. 2 or 3) each rotor assembly rotating about an axis of rotation 204 and one or more power shafts (not shown in FIG. 2 or 3) configured to rotate about axis of rotation 204. A first fan 206 is coupled to a respective power shaft of the one or more power shafts and a second fan 208 is coupled to a respective power shaft of the one or more power shafts coaxially with first fan 206 and gas turbine engine 202. In some embodiments, first fan 206 is driven by a first LPT through a first power shaft of the one or more power shafts and second fan 208 is driven by a second LPT through a second power shaft of the one or more power shafts. In one embodiment, the first and second LPT are embodied in a single turbine having a rotatable stator and a rotatable rotor, each coupled to a respective shaft and each driving a respective first fan and second fan. In other embodiments, both fans 206 and 208 are driven by a single LPT through a single shaft or by multiple shafts using a gearbox. In the exemplary embodiment, second fan 208 is axially displaced forward of first fan 206. As described herein, both first fan 206 and second fan 208 are coupled to the single power shaft. In one embodiment, the power shaft is a monolithic structure to which, both first fan 206 and second fan 208 are coupled. In an alternative embodiment, the power shaft is not monolithic, and may include intervening bearings, gearboxes, couplings, and the like.

As illustrated in FIGS. 2 and 3 second fan 208 is axially displaced forward of first fan 206, with second fan 208 positioned forward of gas turbine engine 202 and first fan 206 positioned aft of gas turbine engine 202. However, according to other embodiments of the present disclosure, second fan 208 and first fan 206 are both positioned forward of gas turbine engine 202. In still other embodiments, second fan 208 and first fan 206 are both positioned aft of gas turbine engine 202.

A first fan inlet 210 is configured to direct a first stream of air to first fan 206. In the exemplary embodiment, first fan inlet 210 includes an inlet opening 212 of a first fan duct 213. Inlet opening 212 is formed by a forward facing lip 215 of first fan duct 213. A second fan inlet 216 is configured to direct a second stream of air to second fan 208. In the exemplary embodiment, second fan inlet 216 includes an inlet opening 218 of a second fan duct 219. First fan inlet 210 and second fan inlet 216 are configured to channel flow to their respective first fan 206 and second fan 208 as orthogonally with respect to their planes of rotation as possible. In some modes of operation an angle of attack of inlets 212 and 218 may introduce non-axial vector components to the inlet flows. However, such vectors components are typically short-lived and provide only limited magnitudes of velocity in the non-axial directions. In some embodiments, flow straighteners or vanes (not shown) are used to straighten the first or second stream of air in first fan duct 213 and/or second fan duct 219.

Gas turbine engine assembly 200 also includes a first fan outlet 221 and a second fan outlet 225. First fan outlet 221 includes an outlet opening 220 defined by an aft facing lip 227 of first fan duct 213. Second fan outlet 222 includes an outlet opening 220 defined by an aft facing lip 229 of second fan duct 219. As used herein, an inlet portion of the first and second fan ducts generally extend from a respective inlet opening to approximately a first plane of rotation 214 of first fan 206 or a second plane of rotation 219 of second fan 208. An outlet portion of first and second ducts 213 and 219, generally extend from approximately plane 214 or 219 to a respective fan outlet opening 220 or 222. In some embodiments, however, flows of core engine exhaust gases and fan outlet flow may be mixed resulting in the flows of first fan outlet flow and/or second fan outlet flow containing at least some combustion products from the core engine exhaust. A first fan outlet 220 is configured to direct a first fan outlet flow axially aftward in a direction 223 substantially parallel to axis of rotation 204. A second fan outlet 222 is configured to direct a second fan outlet flow axially aftward in direction 223 substantially parallel to axis of rotation 204. However, because the outlet flow from second fan 208 is routed around first fan 206 and first fan duct 210, second fan outlet flow is directed axially aftward in direction 223 substantially parallel to axis of rotation 204 initially and is then turned to follow an outer surface of first fan duct 210. A core engine exhaust outlet 226 is configured to direct a stream of exhaust gases from core engine 102 (shown in FIG. 1) in direction 223.

Figure 4:
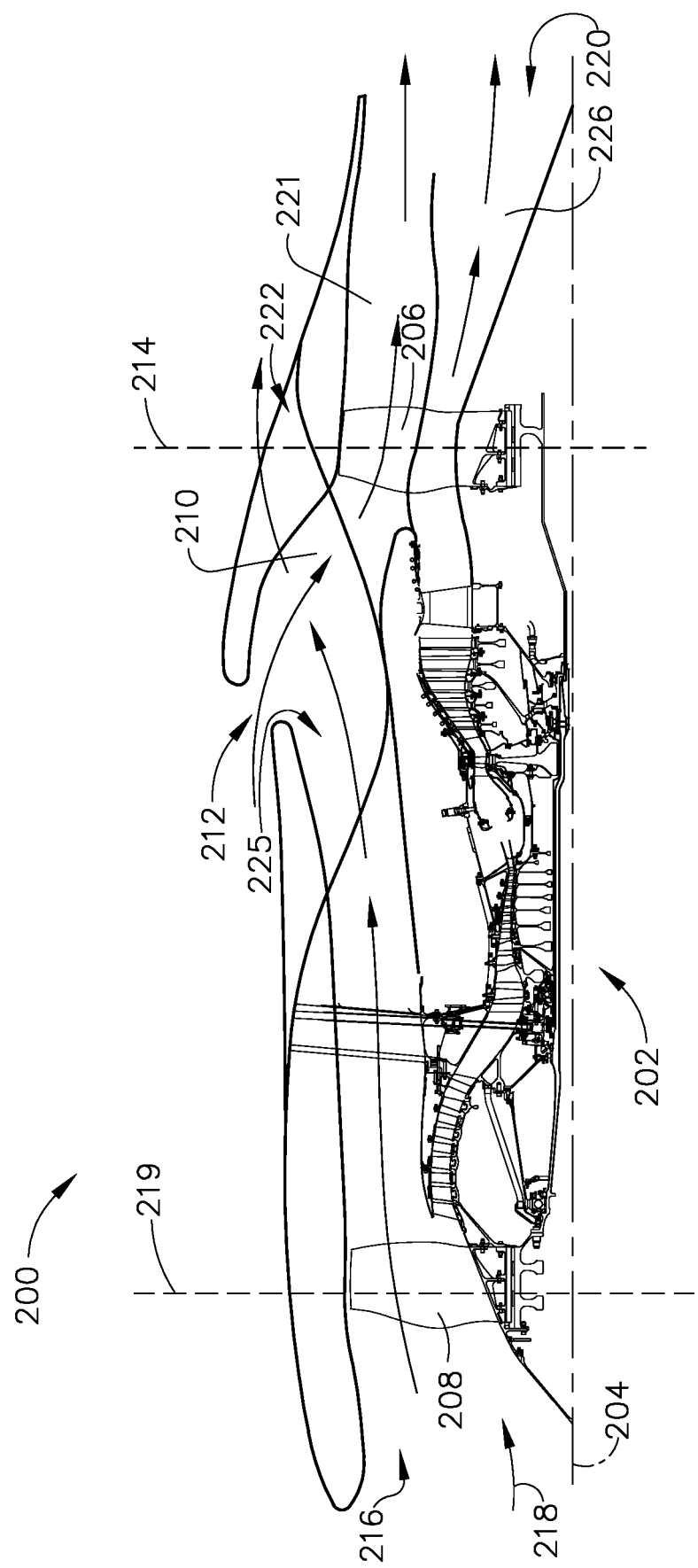

FIG. 4 is a side elevation view of gas turbine engine assembly 200 in an embodiment of the present disclosure. In the exemplary embodiment, gas turbine engine assembly 200 is illustrated with first fan 206 positioned aft of gas turbine engine 202 and with second fan 208 positioned forward of gas turbine engine 202. In this configuration, second fan inlet opening 218 is axisymmetric and first fan inlet 212 is offset with respect to second fan inlet opening 218 to accommodate second fan outlet flow being channeled around first fan inlet opening 212.

Figure 5:
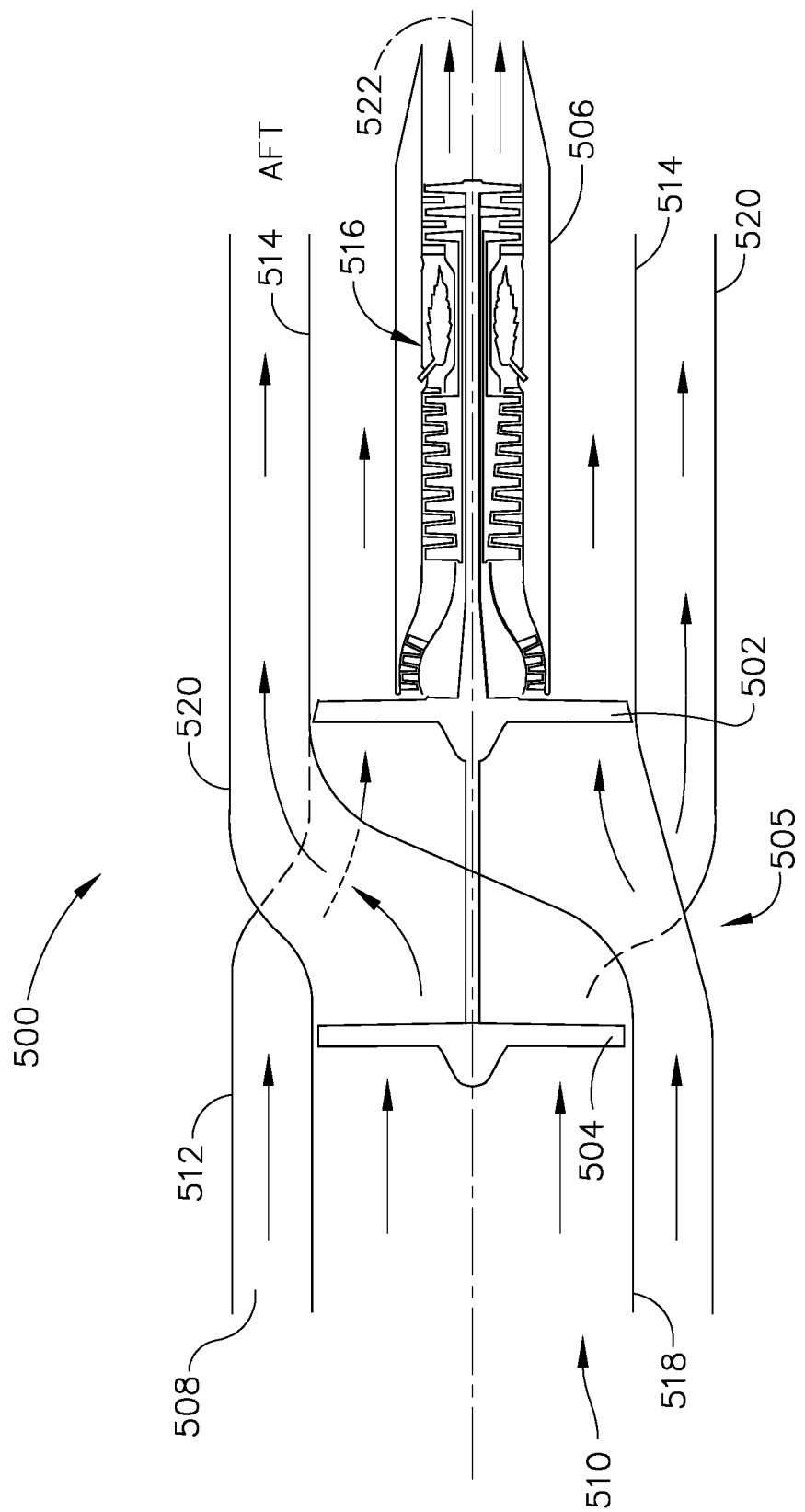

FIG. 5 is a side elevation view of a gas turbine engine assembly 500 in accordance with another embodiment of the present disclosure. In the exemplary embodiment, a first fan 502 and a second fan 504 are positioned on a forward end 505 of a gas turbine engine portion 506 of gas turbine engine assembly 500. First fan 502 and second fan 504 are coaxial with respect to each other and with respect to gas turbine engine portion 506. A first inlet 508 associated with first fan 502 and a second inlet 510 associated with second fan 504 are parallel with respect to each other and direct separate flows of inlet air to a respective fan of first fan 502 and second fan 504. A first fan duct 512 channels inlet flow from first inlet 508, around second fan 504 to first fan 502. An outlet flow of first fan 502 is channeled by a first duct 514 axially aft past a core engine 516 of gas turbine engine portion 506. A second fan duct 518 channels inlet flow from second inlet 510, directly into second fan 504. An outlet flow of second fan 504 is channeled by a second duct 520 axially aft around first fan 502 and past core engine 516 radially outwardly from first duct 514. An exhaust from core engine 516 is channeled axially aft parallel to an engine centerline or axis of rotation 522.

Figure 6:
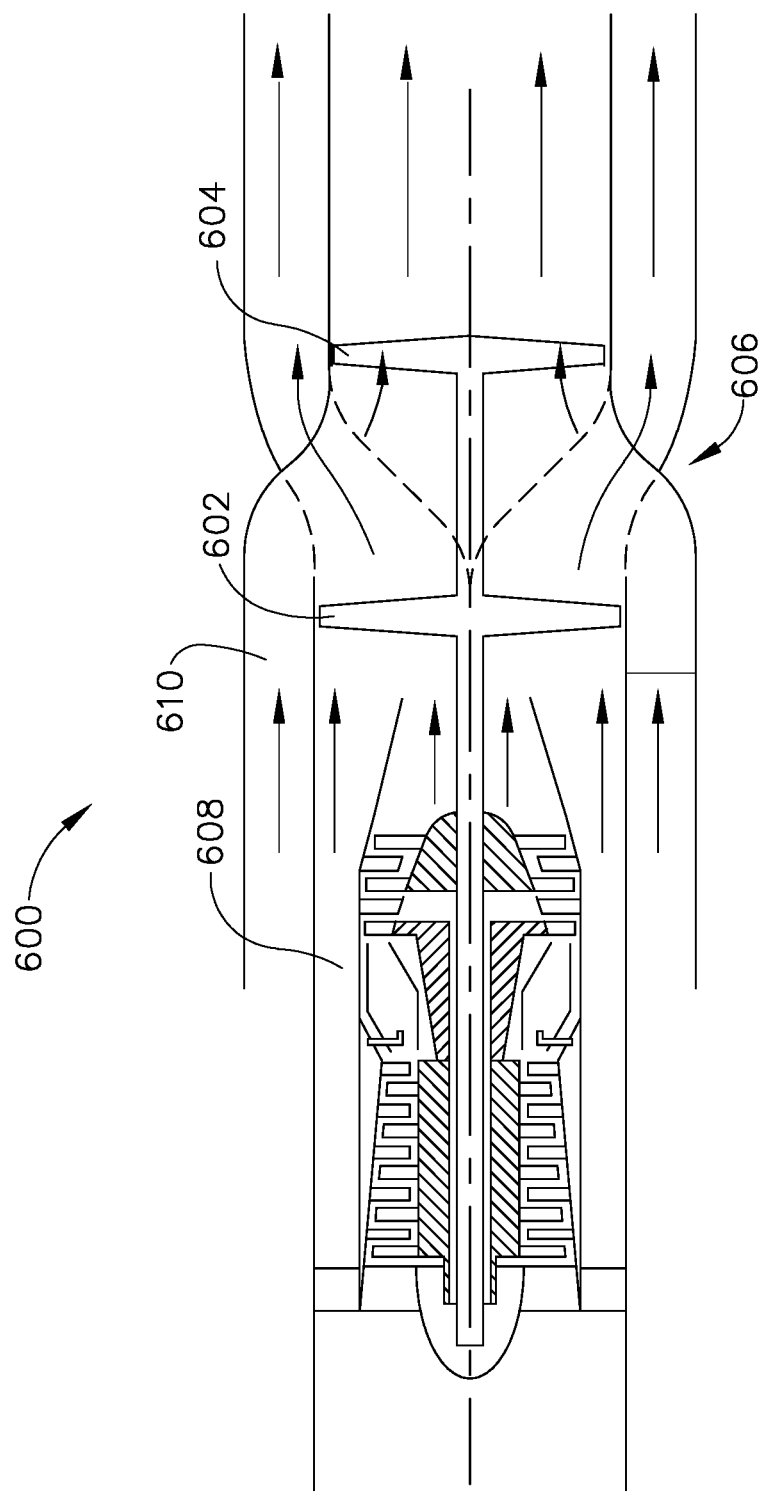

FIG. 6 is a side elevation view of a gas turbine engine assembly 600 in accordance with another embodiment of the present disclosure. In the exemplary embodiment, a first fan 602 and a second fan 604 are both positioned coaxially with respect to each other on an aft end 606 of gas turbine engine assembly 600. A first fan duct 608 and a second fan duct 610 are parallel. First fan 602 and second fan 604 compress separate streams of air through their respective fan ducts 608 and 610.

Figure 7:
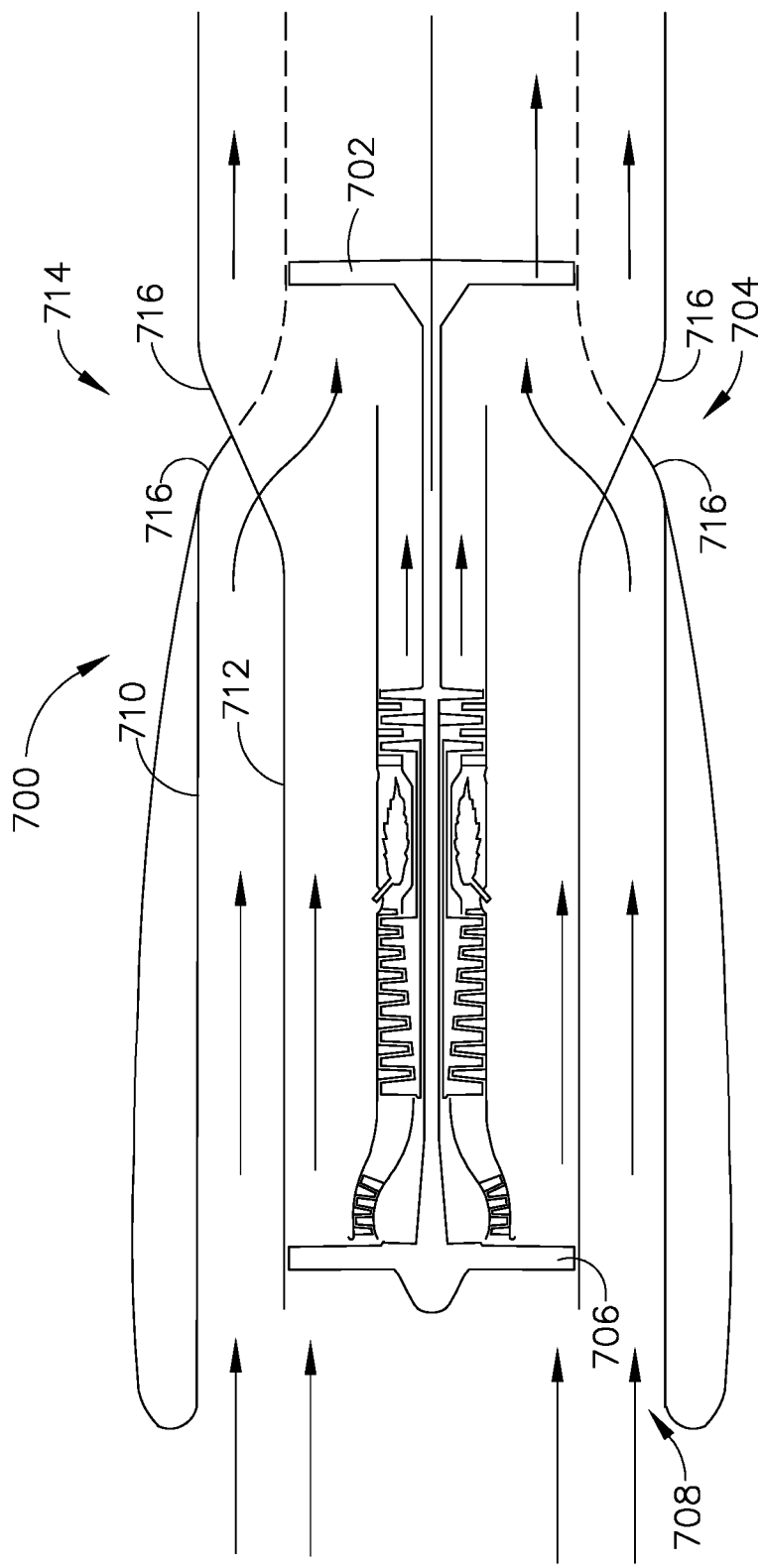

FIG. 7 is a side elevation view of a gas turbine engine assembly 700 in accordance with another embodiment of the present disclosure. In the exemplary embodiment, a first fan 702 is positioned on an aft end 704 of gas turbine engine assembly 700 and a second fan 706 is positioned coaxially with first fan 702 forward of gas turbine engine assembly 700. In the exemplary embodiment, first fan 702 and second fan 706 both receive a respective stream of air through a common inlet 708, which initially receives the totality of air entering first fan 702 and second fan 706, and which is then being divided at a lower Mach number to the respective fans, first fan 702 and second fan 706. A first fan duct 710 and a second fan duct 712 are parallel. First fan 702 and second fan 706 compress separate streams of air through their respective fan ducts 710 and 712. Where first fan duct 710 and second fan duct 712 crossover 714, first fan duct 710 and/or second fan duct 712 may be formed of a plurality of lobes 716. Each lobe 716 is configured to supply a portion of total air flow through each respective fan (702, 706).

Figure 8B:
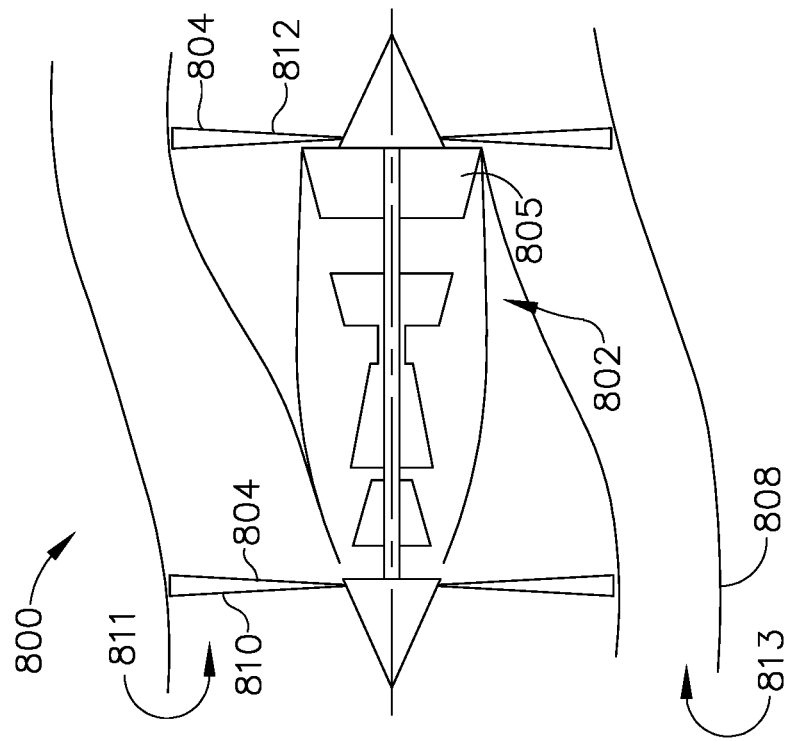
FIG. 8B is a side elevation view of the gas turbine engine assembly shown in FIG. 8A.
Figure 8A:
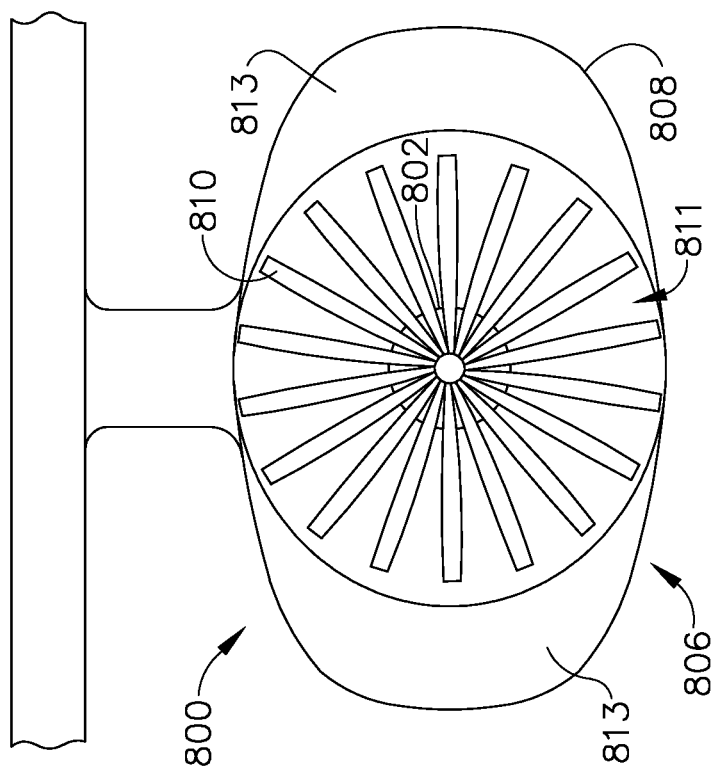
FIG. 8A is an axial view looking aft of a gas turbine engine assembly.

FIG. 8A is an axial view looking aft of a gas turbine engine assembly 800. FIG. 8B is a side elevation view gas turbine engine assembly 800. In the exemplary embodiment, gas turbine engine assembly 800 includes a gas turbine engine 802 including a plurality of coaxial fans 804 that each compresses a separate stream of air. In some embodiments, plurality of coaxial fans 804 are powered from one or more low pressure turbines (LPT) 805 through respective shafts, gearboxes, couplings and the like. Gas turbine engine assembly 800 also includes a common fan inlet assembly 806 that includes a single generally oval-shaped common inlet duct 808. An internal duct structure inside fan inlet assembly 806 is configured to divide the incoming air flow at a lower Mach number and to direct separate flows of air to each coaxial fan 804 of the plurality of coaxial fans 804. In an embodiment having two coaxial fans 804, approximately one-half of the flow entering inlet opening 808 is channeled to a first fan 810 through first opening 811 and a remainder of the flow entering inlet opening 808 is channeled to a second fan 812 through a second opening 813. Air channeled to second fan 812 is channeled by ductwork internal to fan inlet assembly 806 and the ductwork may be an annulus positioned radially outwardly from ductwork channeling air to first fan 810. In other embodiments, the ductwork channeling air to first fan 810 may also be circumferentially spaced from ductwork channeling air to second fan 812. In various embodiments, the separate flows of air to each coaxial fan 810, 812 of the plurality of coaxial fans 804 are not equal, but are based on differing capabilities of components in the train of each respective fan 810, 812. For example, a smaller fan may be used for an LPT that does not have the power output of other LPTs.

Figure 9:
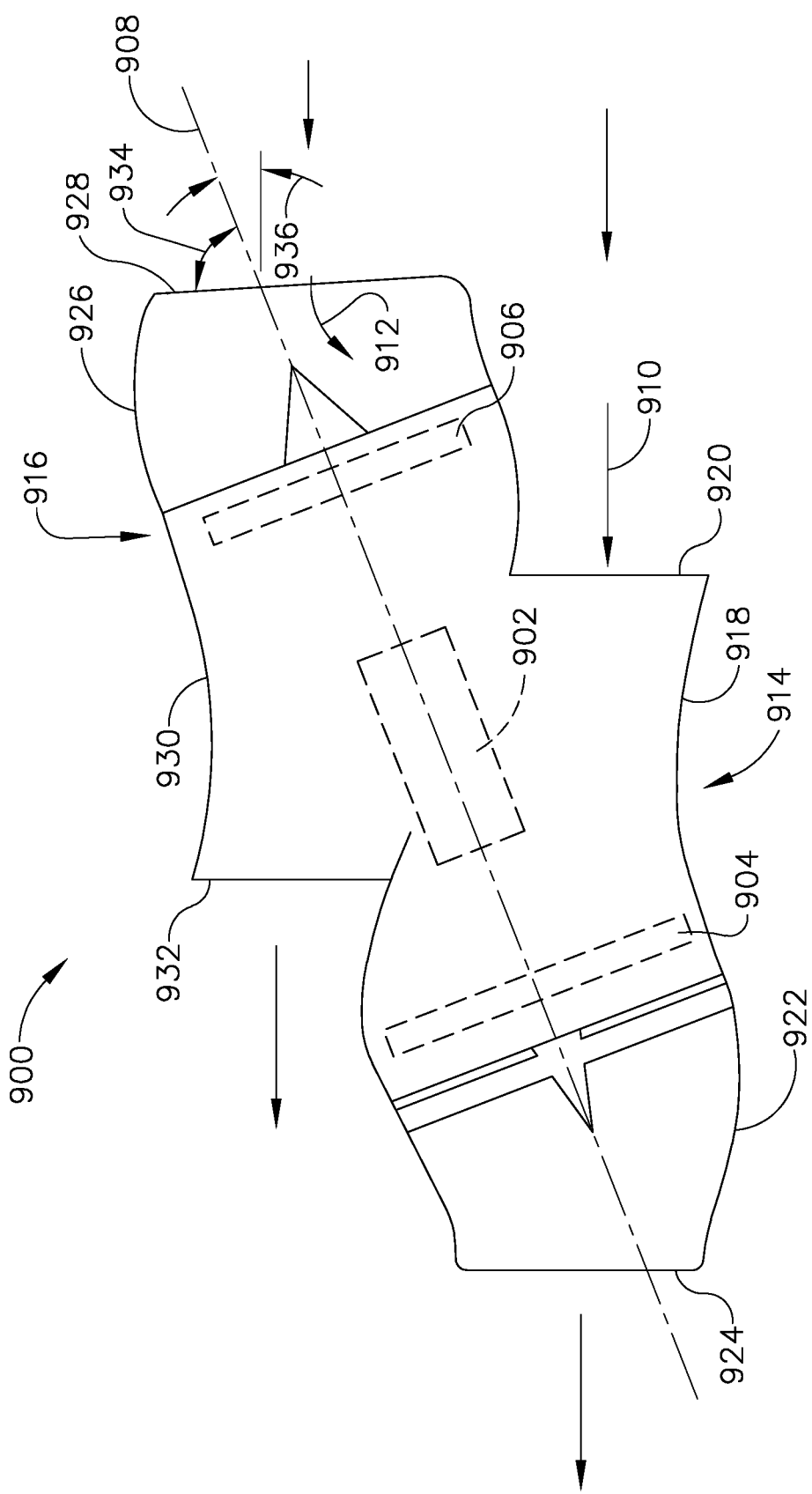

FIG. 9 is a plan view of a gas turbine engine assembly 900 in accordance with another example embodiment of the present disclosure. In the example embodiment, gas turbine engine assembly 900 includes a gas turbine engine 902 including a first fan 904 and a second fan 906. As illustrated in FIG. 9, second fan 906 is positioned forward of first fan 904 on an opposing side of gas turbine engine assembly 900. First fan 904 and second fan 906 are coaxially aligned along an axis 908 of rotation of gas turbine engine assembly 900. Each of first fan 904 and second fan 906 are configured to compressed separate streams of air 910 and 912, respectively.

Gas turbine engine assembly 900 includes a first fan duct assembly 914 and a second fan duct assembly 916. First fan duct assembly 914 includes a first fan duct 918 that extends from a first fan duct inlet opening 920 to approximately first fan 904. A first fan outlet duct 922 extends from approximately first fan 904 to a first fan duct outlet opening 924. Second fan duct assembly 916 includes a second fan duct 926 that extends from a second fan duct inlet opening 928 to approximately second fan 906. A second fan outlet duct 930 extends from approximately second fan 906 to a second fan duct outlet opening 932.

In one embodiment, second fan duct inlet opening 928 is angled with respect to axis 928 by an angle 934, which is less than or equal to ninety degrees. In other embodiments, second fan duct inlet opening 928 is angled with respect to axis 928 by an angle 934, which is greater than ninety degrees. In various embodiments, axis 908 is angled with respect to an airstream entering second fan duct inlet opening 928 by an angle 936.

In operation, gas turbine engine assembly 900 compresses separate streams of air 910 and 912 using coaxial fans mounted on gas turbine engine 902. Each stream of air 910 and 912 is channeled through respective first fan duct assembly 914 and second fan duct assembly 916. Specifically, stream of air 910 is channeled between first fan duct inlet opening 920 and first fan duct outlet opening 924 and stream of air 912 is channeled between second fan duct inlet opening 928 and second fan duct outlet opening 932. Compressing separate streams of air 910 and 912 permits increasing a fan flow for gas turbine engine assembly 900 while maintaining or reducing a fan pressure ratio.

Figure 10:
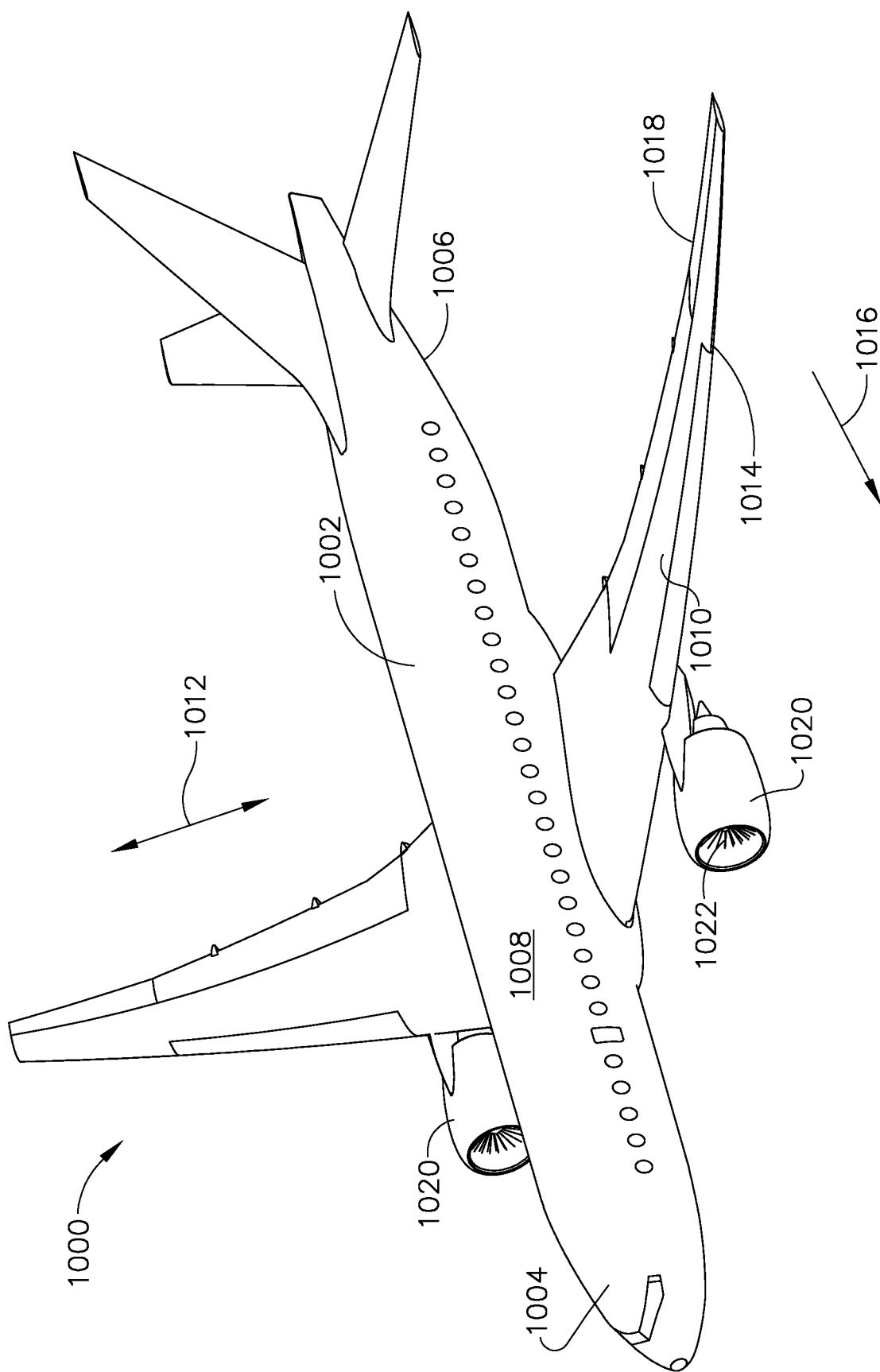

FIG. 10 is a perspective view of an aircraft 1000. In the example embodiment, aircraft 1000 includes a fuselage 1002 that includes a nose 1004, a tail 1006, and a hollow, elongate body 1008 extending therebetween. Aircraft 1000 also includes a wing 1010 extending away from fuselage 1002 in a lateral direction 1012. Wing 1010 includes a forward leading edge 1014 in a direction 1016 of motion of aircraft 1000 during normal flight and an aft trailing edge 1018 on an opposing edge of wing 1010. Aircraft 1000 further includes at least one engine 1020 configured to drive a bladed rotatable member 1022 or fan to generate thrust. Engine 1020 is coupled to at least one of wing 1010 and fuselage 1002, for example, in a pusher configuration (not shown) proximate tail 1006.

It will be appreciated that the above embodiments that have been described in particular detail are merely example or possible embodiments, and that there are many other combinations, additions, or alternatives that may be included.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of operating a gas turbine engine assembly that is formed in one of a plurality of different configurations provides a cost-effective and reliable means for improving a total fan pressure ratio of the gas turbine engine assembly. More specifically, the methods and systems described herein facilitate channeling one stream of air to a first fan of a plurality of fans driven by the gas turbine engine assembly and another separate stream of air to a second fan of the plurality of fans. In addition, the above-described methods and systems facilitate providing a propulsive efficiency benefit to, for example, an aircraft without using lateral transmission equipment such as, but, not limited to, bevel gears. As a result, the method and system described herein facilitate improving gas turbine engine operation in a cost-effective and reliable manner.

Example methods and systems for operating gas turbine engines are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine assembly comprising:
a gas turbine engine comprising a rotor assembly having an axis of rotation, and one or more power shafts configured to rotate about the axis of rotation;
a first fan coupled to said one or more power shafts;
a second fan coaxially coupled to said one or more power shafts with said first fan and said gas turbine engine, said second fan axially displaced forward of said first fan;
a first fan duct comprising a first inlet opening and a first outlet opening, said first fan duct configured to direct a first stream of air to said first fan;
a second fan duct comprising a second inlet opening and a second outlet opening, said second fan duct configured to direct a second stream of air to said second fan, wherein the second stream of air is separate from the first stream of air; and
an exhaust duct configured to direct a stream of exhaust gases of said gas turbine engine in a direction parallel to the axis of rotation;
wherein said second inlet opening is axisymmetric; and
wherein said first inlet opening is formed as a plurality of inlet lobed openings that are each axially downstream and radially outwardly offset with respect to said second inlet opening; and
wherein the second outlet opening is forward of the first fan and aft of the first inlet opening, and configured to route the second stream of air out from the second fan and radially outward around the first inlet opening, the first fan and the first fan duct.

2. The gas turbine engine assembly of claim 1, wherein said first fan and said second fan are each coupled to a different power shaft of the one or more power shafts.

3. The gas turbine engine assembly of claim 1, wherein said gas turbine engine assembly comprises a first low pressure turbine and a second low pressure turbine, said first fan coupled to said first low pressure turbine through a respective first power shaft of the one or more power shafts, said second fan coupled to said second low pressure turbine through a respective second power shaft of the one or more power shafts.

4. The gas turbine engine assembly of claim 1, wherein said gas turbine engine assembly comprises a low pressure turbine comprising a rotatable rotor, said first fan coupled to said rotatable rotor through a respective first power shaft of the one or more power shafts, said second fan coupled to the rotatable rotor through a respective second power shaft of the one or more power shafts.

5. The gas turbine engine assembly of claim 1, wherein said first fan comprises a first diameter and said second fan comprises a second diameter, said second diameter being different than said first diameter.

6. The gas turbine engine assembly of claim 1, wherein at least one of said first fan duct and said second fan duct comprises a crossover duct portion having one or more circumferentially spaced lobes configured to channel the air from the first fan duct to the first fan, and further wherein the one or more circumferentially spaced lobes is configured to channel the air from the second fan to the second outlet opening.

7. The gas turbine engine assembly of claim 1, wherein said first fan comprises a radially inner portion configured to extract work from the stream of exhaust gases and a radially outer portion configured to compress a stream of air.

8. The gas turbine engine assembly of claim 7, wherein said first fan comprises a mid-shroud configured to separate said radially inner portion and said radially outer portion.

9. An aircraft powered by one or more high-bypass turbofan engines, said aircraft comprising:
the gas turbine engine assembly of claim 1.

10. The aircraft of claim 9, wherein an engine exhaust stream exits the gas turbine engine assembly coaxially with the gas turbine engine.

11. The gas turbine engine assembly of claim 1, wherein each of the plurality of inlet lobed openings is outwardly radially offset relative to the axis of rotation.

12. The gas turbine engine assembly of claim 1, wherein only air from said second stream of air is used for combustion in said gas turbine engine assembly.

13. The gas turbine engine assembly of claim 1, wherein the first fan is positioned aft of the gas turbine engine and the second fan is positioned forward of the gas turbine engine.

14. The gas turbine engine assembly of claim 1, wherein the second outlet opening is radially outward of the first outlet opening.

15. The gas turbine engine assembly of claim 1, wherein the first outlet opening is radially outward of an engine exhaust stream exiting the gas turbine engine.

16. The gas turbine engine assembly of claim 1, wherein the second outlet opening is radially outward of the first outlet opening and an engine exhaust stream exiting the gas turbine engine.

17. A gas turbine engine assembly comprising:
 a gas turbine engine comprising a rotor assembly having an axis of rotation, and one or more power shafts configured to rotate about the axis of rotation;
 a first fan coupled to said one or more power shafts;
 a second fan coupled to said one or more power shafts coaxially with said first fan and said gas turbine engine, said second fan axially displaced forward of said first fan;
 a first fan duct comprising a first inlet opening and a first outlet opening, said first fan duct configured to direct a first stream of air to said first fan;
 a second fan duct comprising a second inlet opening and a second outlet opening, said second fan duct configured to direct a second stream of air to said second fan, wherein the second stream of air is separate from the first stream of air; and
 an exhaust duct configured to direct a stream of exhaust gases of said gas turbine engine in a direction parallel to the axis of rotation, and
 wherein the first fan duct and the second fan duct together comprise a crossover duct portion at which the first fan duct and the second fan duct cross each other radially relative to the axis of rotation, such that the second inlet opening is radially inward of the first inlet opening, and the such that the second outlet opening is radially outward of the first outlet opening; and
 wherein said first inlet opening is formed as a plurality of inlet openings that are each axially aft and radially outwardly offset with respect to said second inlet opening, and wherein the second outlet opening is formed forward of the first fan and aft of the first inlet opening.

18. A gas turbine engine assembly comprising:
 a gas turbine engine comprising a rotor assembly having an axis of rotation, and one or more power shafts configured to rotate about the axis of rotation;
 a first fan coupled to said one or more power shafts;
 a second fan coupled to said one or more power shafts coaxially with said first fan and said gas turbine engine, wherein the first fan and the second fan are both axially aft of the gas turbine engine and the second fan is axially forward of the first fan;
 a first fan duct comprising a first inlet opening and first outlet opening, said first fan duct configured to direct a first stream of air to said first fan, and wherein the first inlet opening is axially downstream and radially outwardly offset from an inlet of the gas turbine engine;
 a second fan duct comprising a second inlet opening and a second outlet opening axially forward of the first inlet opening and split off from a common inlet shared with the inlet of the gas turbine engine, said second fan duct configured to direct a second stream of air to said second fan, the second stream of air being separate from the first stream of air; and
 an exhaust duct configured to direct a stream of exhaust gases of said gas turbine engine in a direction parallel to the axis of rotation, and
 wherein the first fan duct and the second fan duct together comprise a crossover duct portion at which the first fan duct and the second fan duct cross each other radially such that the first inlet opening is axially aft and radially outward of the second inlet opening, and the second outlet opening is radially outward of the first outlet opening, and wherein the crossover duct portion comprises a plurality of circumferentially spaced lobes defining the first inlet opening and the second outlet opening at the crossover duct portion.

* * * * *